United States Patent
Ikeguchi (10) Patent No.: US 9,229,559 B2
(45) Date of Patent: Jan. 5, 2016

(54) DISPLAY DEVICE AND METHOD FOR PRODUCING SAME

(75) Inventor: Tazo Ikeguchi, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 323 days.

(21) Appl. No.: 13/989,187

(22) PCT Filed: Nov. 18, 2011

(86) PCT No.: PCT/JP2011/076646
§ 371 (c)(1),
(2), (4) Date: May 23, 2013

(87) PCT Pub. No.: WO2012/070484
PCT Pub. Date: May 31, 2012

(65) Prior Publication Data
US 2013/0249846 A1    Sep. 26, 2013

(30) Foreign Application Priority Data
Nov. 26, 2010  (JP) ................................ 2010-263295

(51) Int. Cl.
G06F 3/041   (2006.01)
G06F 1/16    (2006.01)
G02F 1/1333  (2006.01)

(52) U.S. Cl.
CPC ............ *G06F 3/041* (2013.01); *G02F 1/13338* (2013.01); *G02F 1/133308* (2013.01); *G06F 1/1601* (2013.01); *G02F 2001/133322* (2013.01); *G06F 2200/1612* (2013.01); *Y10T 29/49002* (2015.01)

(58) Field of Classification Search
CPC .................. G06F 1/1601; G06F 3/041; G06F 2200/1612; G02F 1/13338; G02F 1/133308; G02F 2001/133322; Y10T 29/49002
USPC ......................................................... 345/173
See application file for complete search history.

(56) References Cited

U.S. PATENT DOCUMENTS

| | | | | |
|---|---|---|---|---|
| 5,477,357 A * | 12/1995 | Suzuki | ............. | G02F 1/133308 349/110 |
| 6,426,784 B1 * | 7/2002 | Sakai | ................ | G02F 1/133308 349/58 |
| 2001/0002145 A1 * | 5/2001 | Lee | ................... | G02F 1/133308 349/58 |
| 2007/0002209 A1 * | 1/2007 | Tai | .................... | G02F 1/133308 349/58 |
| 2009/0316087 A1 * | 12/2009 | Chien | ............... | G02F 1/133514 349/106 |
| 2010/0066702 A1 * | 3/2010 | Lee | .......................... | G06F 3/044 345/174 |
| 2010/0315575 A1 * | 12/2010 | Chang | ............... | G02F 1/133308 349/62 |
| 2012/0120340 A1 * | 5/2012 | Lim | .................. | G02F 1/133308 349/58 |
| 2012/0129579 A1 * | 5/2012 | Tam | ....................... | G01J 5/0025 455/575.1 |
| 2013/0020573 A1 * | 1/2013 | Fukuyama | ............. | G01L 1/146 257/53 |
| 2014/0063360 A1 * | 3/2014 | Kunishi | .................. | G06F 3/044 349/12 |

FOREIGN PATENT DOCUMENTS

JP    2005-222091 A    8/2005
WO   WO 2011024254 A1 *   3/2011  ........ G02F 1/133308

* cited by examiner

*Primary Examiner* — Nitin (Kumar) Patel
*Assistant Examiner* — Vinh Lam
(74) *Attorney, Agent, or Firm* — Chen Yoshimura LLP (57) ABSTRACT

A display device (100) of the present invention is configured in such a manner that a liquid crystal module (30) is inserted in the inside (of the inner faces) of a positioning frame (20) that is attached to a top window (10). This eliminates the need to consider a positioning tolerance for the attachment. As a result, the display device can be reduced in size and a narrow frame can be achieved.

13 Claims, 4 Drawing Sheets

DISPLAY DEVICE AND METHOD FOR PRODUCING SAME

TECHNICAL FIELD

The present invention relates to a display device that displays an image and a method of manufacturing the same. More particularly, the present invention relates to a display device that is provided with a surface protector attached to a display surface, and a method of manufacturing the same.

BACKGROUND ART

In recent years, display devices such as personal digital assistants that require operations including menu selections are increasingly provided with a touch panel. Through the touch panel, a user performs an operation such as selecting a desired menu by pressing the panel with a stylus or a finger in accordance with the display on the screen. For touch panels used in such personal digital assistants, various known types are employed such as a resistive type, a capacitive type, a photosensor type, and an infrared type, to detect a pressed position on the panel.

In most cases, display devices equipped with such a touch panel are provided with a surface protector such as a decorative laminate or a cover so as to protect the surface touched by a finger and the like. The surface protector is attached to a touch panel or a liquid crystal module with a touch panel so as to make no gap therebetween, but even when a positioning tool and the like are used upon installation, in some cases, the surface protector is slightly displaced from a prescribed installation position. If the dimensions of the respective parts are designed without taking into account the displacement amount, it is possible to cause a problem that a touch panel (liquid crystal module with a touch panel) having the surface protector attached thereto cannot be installed in a device case. For this reason, conventionally, the tolerances have been designed taking into account the displacement amount.

However, the larger the tolerances are, the more difficult it becomes to achieve a size reduction and a narrower frame in the display device, and therefore, techniques to reduce the tolerances have been proposed up to now. For example, Japanese Patent Application Laid-Open Publication No. 2005-222091 discloses a configuration of an electronic device equipped with a shielding member that has a structure to determine a position of a touch panel with respect to a module including a display device.

RELATED ART DOCUMENT

Patent Document

Patent Document 1 Japanese Patent Application Laid-Open Publication No. 2005-222091

SUMMARY OF THE INVENTION

Problems to be Solved by the Invention

In the configuration disclosed in Japanese Patent Application Laid-Open Publication No. 2005-222091, the shielding member has a structure that determines a position of the touch panel with respect to the module, which prevents a misalignment therebetween. Therefore, it is possible to eliminate a need to take into account a margin for misalignment between the two. However, a surface protector such as a cover and a touch panel (or a module) can still be misaligned to each other, and a margin for misalignment between the two needs to be taken into account as in a conventional configuration.

If the surface protector and the module with a touch panel are misaligned to each other, even when the module itself can be installed in a device case, it is possible that the module makes a constant contact with the device case. Because the display module with a touch panel (a liquid crystal module, for example) is typically made of glass, and is therefore susceptible to a shock, if the module is in contact with the device case, the module may be broken due to an external shock.

To address this issue, the position tolerance of the surface protector with respect to the display panel (touch panel) needs to be made large so as to prevent the display module from making contact with the device case. This makes the tolerance for the entire device larger, and as a result, it becomes more difficult to achieve a size reduction and a narrower frame in the display device.

The present invention aims at providing a display device that can eliminate a need to take into account a position tolerance in attaching a display module to a surface protector, and a manufacturing method thereof.

Means for Solving the Problems

In the first aspect, the present invention provides a display device that includes:
a display module having a rectangular display surface;
a case in which the display module is stored;
a surface protector of a flat plate shape attached to the display surface of the display module so as to protect the display surface entirely, the surface protector having a flat surface that faces the display surface and that is larger than the display surface, the surface protector also having outer side faces perpendicular to the flat surface; and
a positioning member attached to the flat surface of the surface protector for determining a position of the display module with respect to the surface protector, the positioning member having first and second inner side faces adjacent to each other, the first and second inner side faces being perpendicular to a surface of the positioning member facing the flat surface, the first and second inner side faces facing or making contact with corresponding side faces of the display module,
wherein the positioning member has first and second outer side faces that are adjacent to each other and that are respectively parallel to the first and second inner side faces, and the positioning member is attached to the surface protector such that the first and second outer side faces lie on substantially same planes as corresponding adjacent two side faces, respectively, among the outer side faces of the surface protector.

The second aspect of the present invention is the invention of the first aspect,
wherein the positioning member has a third inner side face that is parallel to one of the first and second inner side faces and that is in contact with another of the first and second inner side faces, and a third outer side face that is parallel to one of the first and second outer side faces and that is in contact with another of the first and second outer side faces,
wherein the third inner side face faces or makes contact with one of side faces of the display module, and
wherein the third outer face and one of the outer side faces of the surface protector lie on a substantially same plane.

The third aspect of the present invention is the invention of the second aspect, wherein the positioning member is formed in a frame shape that has four inner side faces including the first to third inner side faces, and four outer side faces including the first to third outer side faces.

The fourth aspect of the present invention is the invention of the first aspect, wherein the positioning member is bonded to the case through an adhesive agent, the adhesive agent being provided to the positioning member on a flat surface that is opposite to the surface facing the surface protector.

The fifth aspect of the present invention is the invention of the first aspect, wherein the surface protector is bonded to both of the positioning member and the display module through an adhesive agent, respectively.

The sixth aspect of the present invention is the invention of the first aspect, wherein the positioning member is bonded to the surface protector through an adhesive agent, and wherein the display module is attached to the surface protector by being bonded to the positioning member through an adhesive agent.

The seventh aspect of the present invention is the invention of the first aspect, wherein the display module includes a touch panel.

The eighth aspect of the present invention is the invention of the first aspect, wherein the display module includes a glass substrate.

In the ninth aspect, the present invention provides a method of manufacturing a display device, including:

a first step of attaching a positioning member to a surface protector that protects an entire display surface of a display module, the display surface having a rectangular shape, the positioning member being provided to determine a position of the display module with respect to the surface protector;

a second step of attaching the display module to the surface protector having the positioning member attached thereto in the first step; and a third step of attaching the surface protector to a device case such that the display module is stored in the device case, the surface protector having the positioning member and the display module attached thereto in the first and second steps, wherein, in the second step, the display module is attached to the surface protector such that first and second inner side faces of the positioning member that are adjacent to each other face or make contact with corresponding side faces of the display module, the first and second inner side faces being perpendicular to a surface of the positioning member, the surface facing a flat surface of the surface protector that faces the display surface and that is larger than the display surface, and wherein, in the first step, the positioning member is attached to the surface protector such that first and second outer side faces of the positioning member that are adjacent to each other and that are respectively parallel to the first and second inner side faces lie on substantially same planes as corresponding two outer side faces of the surface protector, respectively, the prescribed two side faces being adjacent to each other.

In the tenth aspect, the present invention provides a method of manufacturing a display device, including:

a first step of attaching a display module to a positioning member, the positioning member being provided to determine a position of the display module with respect to a surface protector that protects an entire display surface of the display module, the display surface having a rectangular shape;

a second step of attaching, to the surface protector, the positioning member having the display module attached thereto in the first step; and a third step of attaching the surface protector to a device case such that the display module is stored in the device case, the surface protector having the positioning member and the display module attached thereto in the first and second steps, wherein, in the first step, the display module is attached to the positioning member such that first and second inner side faces of the positioning member that are adjacent to each other face or make contact with corresponding side faces of the display module, the first and second inner side faces being side faces that are perpendicular to a surface of the positioning member, the surface facing a flat surface of the surface protector that faces the display surface and that is larger than the display surface, and wherein, in the second step, the positioning member is attached to the surface protector such that first and second outer side faces of the positioning member that are adjacent to each other and that are respectively parallel to the first and second inner side faces lie on substantially same planes as corresponding two outer side faces of the surface protector, respectively, the prescribed two side faces being adjacent to each other.

Effects of the Invention

According to the first aspect, because corresponding side faces of the display module face or make contact with the first and second inner side faces of the positioning member, the display module is automatically positioned (within a region) inside of the positioning member (typically, the display module is self-aligned). The first and second outer side faces of the positioning member lie on substantially same planes as corresponding outer side faces of the surface protector, respectively, and therefore, by making sure the these outer side faces lie on the same plane before assembling the two, for example, the positioning member can be attached to the surface protector accurately with ease. Therefore, it is possible to eliminate a need to take into account a margin for misalignment in attaching the display module to the surface protector. As a result, a size reduction and a narrower frame in the display device can be achieved.

According to the second aspect, the third inner side face of the positioning member also faces or makes contact with one of the side faces of the display module, and the third outer side face and one of the outer side faces of the surface protector lie on the substantially same plane. This makes it possible to achieve more accurate positioning by using three planes.

According to the third aspect, the fourth inner side face of the positioning member also faces or makes contact with one of the side faces of the display module, and the fourth outer side face and one of the outer side faces of the surface protector lie on the substantially same plane. This makes it possible to achieve more accurate positioning by using four planes (typically by placing the display module inside of the positioning member).

According to the fourth aspect, the positioning member is bonded to the case by an adhesive agent provided on a surface that is opposite to the surface of the positioning member facing the surface protector. Therefore, it is possible to store and fix the display module inside the case with ease.

According to the fifth aspect, the surface protector is bonded to both of the positioning member and the display module by an adhesive agent, respectively, and therefore, it is possible to attach these components to each other with ease.

According to the sixth aspect, the display module is attached to the surface protector by being bonded to the positioning member through an adhesive agent, and therefore, it is possible to attach the display module to the surface protector with ease.

According to the seventh aspect, the display module includes a touch panel. Therefore, it is possible to eliminate a need to take into account a margin for misalignment in attaching the display module to a surface protector that is typically provided to protect the touch panel from contact.

According to the eighth aspect, the display module includes a glass substrate. Therefore, it is possible to reduce a margin that typically needs to be set large so as to reliably prevent damage caused by the glass substrate making contact with the case.

According to the ninth and tenth aspects, it is possible to achieve the effects of the display device of the first aspect, and also to manufacture (typically assemble) such a display device with ease.

DETAILED DESCRIPTION OF EMBODIMENTS

1. Overall Device Configuration

Figure 1:
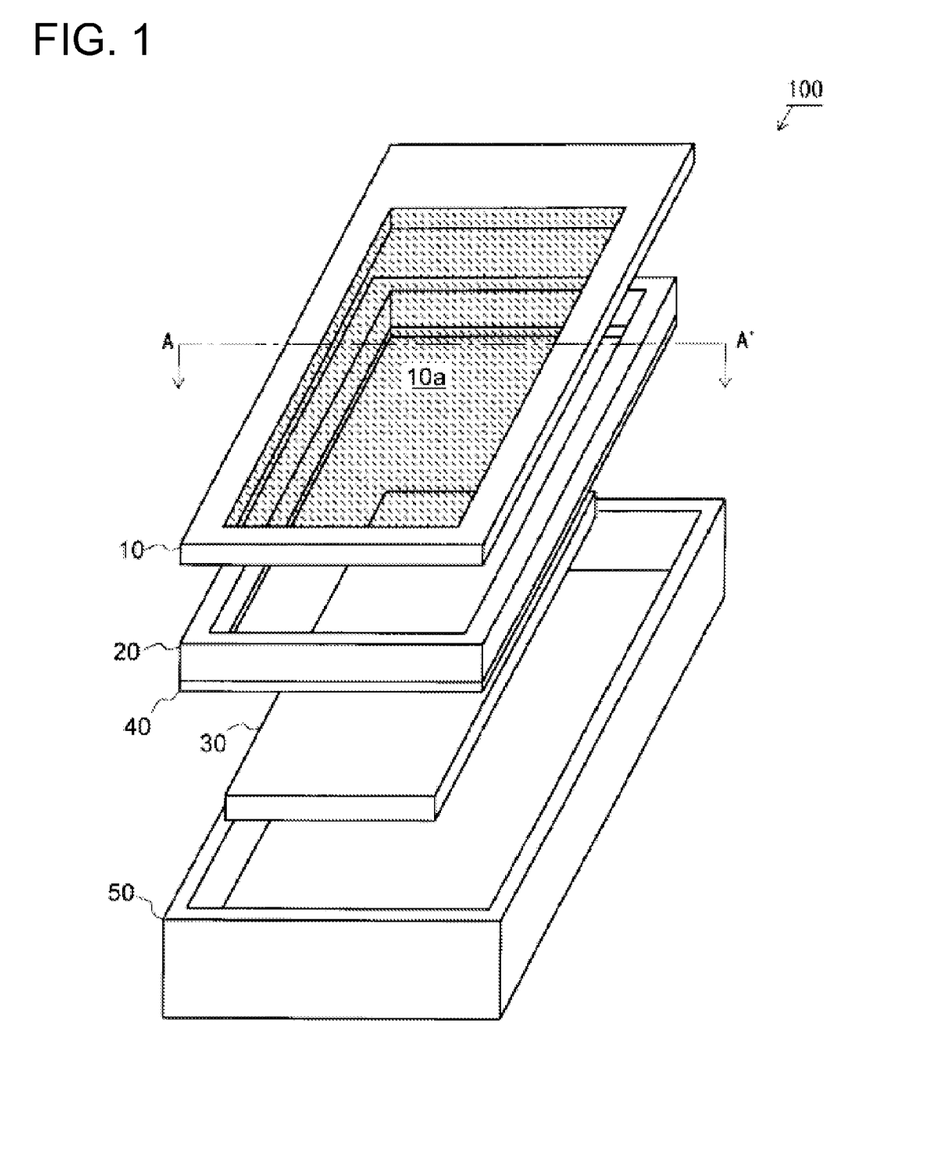
FIG. 1 is a simplified exploded perspective view of a display device of one embodiment of the present invention.
Figure 2:
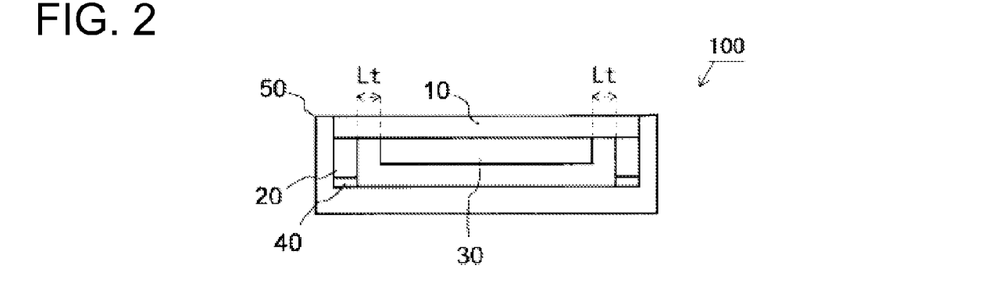
FIG. 2 is a cross-sectional view along the line A-A' of FIG. 1.

FIG. 1 is a simplified exploded perspective view showing a structure of a display device of one embodiment of the present invention. FIG. 2 is a cross-sectional view along the line A-A' of FIG. 1. These drawings and the drawings referred to below are provided for illustrating a structure in a simple manner, and are different from the actual structures.

As shown in FIGS. 1 and 2, the display device 100 includes a liquid crystal panel 30 with a touch panel (referred to as a "liquid crystal module 30" below), a top window 10 provided to protect a surface of the liquid crystal module 30, a positioning frame 20 that is bonded to the top window 10 in a prescribed position, a double-sided adhesive tape 40 applied to the lower side of the positioning frame 20, and a case 50 made of a magnesium alloy (or other rigid materials).

The top window (decorative panel) 10 functions as a surface protector that protects a surface of the liquid crystal module 30, and includes a window 10a that is made of a transparent resin with high rigidity and a frame that is provided to support the window 10a and that is made of a non-transparent resin. Known materials for a decorative panel member can be appropriately used for these members.

The positioning frame 20 is bonded to the top window 10 in a prescribed position, and functions as a positioning member that helps the liquid crystal module 30 to be bonded to the top window 10 in a prescribed position. The positioning frame 20 is made of a resin such as polyimide, but may be made of appropriate known materials that can function as the positioning member. However, it is preferable that the positioning frame 20 be made of a material that absorbs a shock, that can be bonded to the top window 10 with ease, and that can be bonded to the case 50 through the double-sided adhesive tape 40 with ease. The detailed configuration and function of the positioning frame 20 will be later described.

The liquid crystal module 30 includes an active matrix type liquid crystal panel. The liquid crystal panel includes two glass substrates and a liquid crystal layer sandwiched therebetween. The liquid crystal panel is configured such that a scan driver and a data driver included in a not-shown circuit board select and provide data to respective pixels in the liquid crystal panel, thereby forming an image on a display surface. The display device 100 of the present embodiment may include a circuit board that includes the above-mentioned circuit or other electric circuits, or other constituting elements not shown in FIG. 1 or 2.

On the upper surface (front surface) of the liquid crystal module 30, a transparent touch panel that functions as an input unit is provided, and typically, when the screen is pressed (or contacted) by a finger of a user or a stylus, the pressed position (contacted position) on the screen is detected.

Any of various known touch panels such as a resistive type, a capacitive type, a photosensor type, and a mechanical sensor type may be used for this touch panel as long as a surface protector is attached to the upper surface thereof. The touch panel may be formed integrally with the liquid crystal module 30 in the upper layer thereof, or alternatively, may be bonded onto the liquid crystal panel through an adhesive agent or the like.

2. Configuration and Function of Positioning Frame

Figure 3:
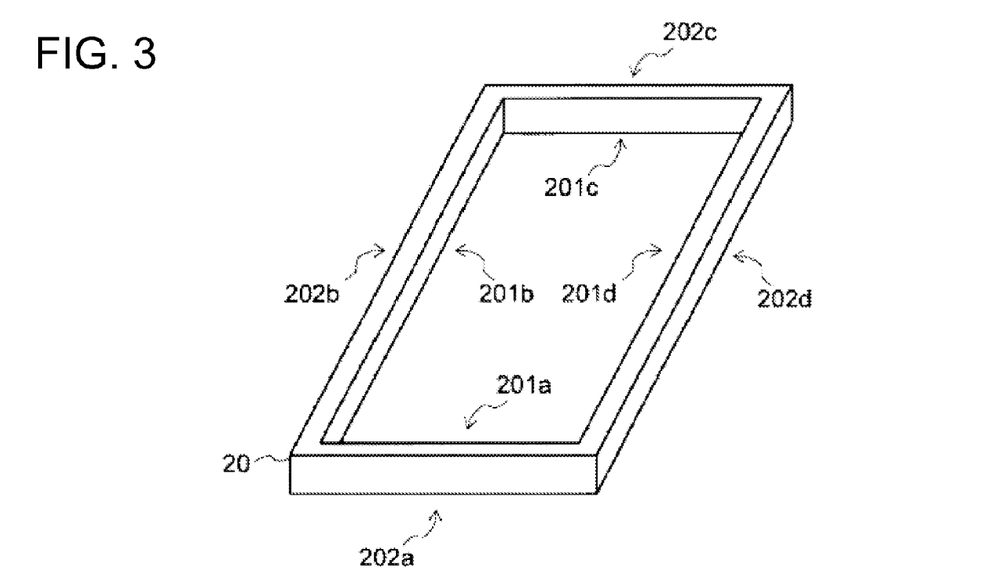
FIG. 3 is a schematic perspective view showing a structure of a positioning frame in the embodiment.

FIG. 3 is a schematic perspective view showing a structure of the positioning frame shown in FIG. 1. As shown in FIG. 3, the positioning frame 20 is formed in a frame shape having four inner side faces 201a to 201d and four outer side faces 202a to 202d, and the liquid crystal module 30 is positioned inside the four inner side faces 201a to 201d. Below, a manufacturing process (assembly process in this example) of the display device 100 will be explained in sequence, and a function of the positioning frame 20 will also be explained.

First, as a first manufacturing step, the positioning frame 20 is bonded to a prescribed position of the top window 10 accurately so as not to protrude to the outside. The length between the outer sides of the positioning frame 20 along the width direction (length in the horizontal direction in the figure), that is, the length of the longer side of the outer side face 202a is set to coincide with the length of the top window 10 in the width direction. Therefore, by positioning the positioning frame 20 such that the outer side face 202a thereof and a corresponding outer side face of the top window 10 lie on the same plane, and such that the outer side face 202b or the outer side face 202d thereof and a corresponding outer side face of the top window 10 lie on the same plane, the positioning frame 20 can be bonded to the top window 10 properly so as not to protrude to the outside with ease.

The positioning of these components is performed by using a positioning tool that can define the positions of the side faces and the like by having at least two flat surfaces perpendicular to each other, for example. Specifically, the outer side face 202a and the corresponding outer side face of the top window 10, and the outer side face 202b (or the outer side face 202d) and the corresponding outer side face of the top window 10 are caused to make contact with the respective two flat surfaces of the positioning tool, which are perpendicular to each other. In this way, the position of the positioning frame 20 with respect to the top window 10 can be properly determined with ease (for bonding). Even without such a positioning tool, it is relatively easy to make a side face of the positioning frame 20 and a side face of the top window 10 lie on the same plane, and therefore, the two components can be bonded to each other accurately with ease.

Next, as the second manufacturing step, the liquid crystal module 30 is inserted into the positioning frame 20, and is bonded to the top window 10. The length between the inner sides of the positioning frame 20 in the width direction (length in the horizontal direction in the drawing), that is, the length of the longer side of the inner side face 201a is slightly larger than the length of the liquid crystal module 30 in the width direction (by the margin 2Lt in FIG. 2). Thus, by placing the liquid crystal module 30 inside of the positioning frame 20 (inside of the area enclosed by the four inner side faces 201a to 201d), the liquid crystal module 30 can be bonded to the top window 10 in a proper position with ease.

The margin 2Lt is appropriately set to the smallest value (to achieve a narrower frame) that allows the liquid crystal module 30 to be inserted reliably, taking into account dimensional errors in the liquid crystal module 30 and the positioning frame 20, thermal expansion, a margin for the inserting process, and the like.

When the liquid crystal module 30 is inserted into the positioning frame 20, ideally, as shown in FIG. 2, the liquid crystal module 30 is placed in a position where the inner side faces 201a to 201d are at an equal distance from corresponding four side faces of the liquid crystal module 30, respectively. However, even if the liquid crystal module 30 is not placed in the ideal location, at least one or adjacent two of the inner side faces 201a to 201d cannot be moved beyond the position where side faces thereof make contact with corresponding side faces of the liquid crystal module 30, and therefore, the liquid crystal module 30 is not moved from the ideal position beyond a distance equal to or greater than the length Lt.

That is, by using the positioning frame 20, the liquid crystal module 30 can be automatically and accurately bonded to the top window 10 in a position that is within the length Lt from the ideal position. That is, the liquid crystal module 30 is self-aligned by the positioning frame 20.

Thereafter, as the third manufacturing step, the double-sided adhesive tape 40 is bonded to a surface of the positioning frame 20 opposite to the surface bonded to the top window 10, and through this double-sided adhesive tape 40, the positioning frame 20 is bonded to the case 50 (along with the top window 10 and the liquid crystal module 30). This makes it possible to store and fix the liquid crystal module 30 in the case 50 with ease.

As described above, by using the positioning frame 20, the self-alignment effect can be achieved, which allows the positioning process to be performed more accurately than the manual positioning using a positioning tool and the like. Therefore, it is possible to set the entire tolerance to a smaller value. Also, because of the self-alignment effect, the position tolerance of the liquid crystal module 30 to the top window 10 no longer needs to be considered.

The positioning frame 20 is made of a material that can absorb a shock, and therefore, in the present embodiment, the position tolerance can be set to even smaller values as compared to the conventional configuration. This will be explained in detail below with reference to FIG. 4.

Figure 4:
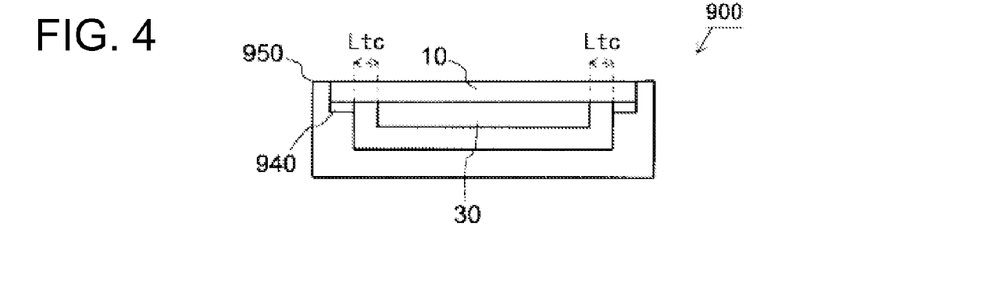
FIG. 4 is a simplified cross-sectional view showing a structure of a conventional display device.

FIG. 4 is a simplified cross-sectional view showing a structure of a conventional display device. A conventional display device 900 shown in FIG. 4 includes the top window 10 and the liquid crystal module 30, which are the same as those in the display device 100 of the present embodiment, a double-sided adhesive tape 940 similar to that of the display device 100, and a case 950 that has a different shape from that of the display device 100. It is apparent that the conventional display device 900 is not provided with the positioning frame 20, which is the characteristic component of the present embodiment.

In the conventional display device 900, the liquid crystal module 30 is bonded to the top window 10 in a manufacturing process that corresponds to the first and second manufacturing steps above. A known positioning tool may be used for this bonding process. Thereafter, in a manufacturing step corresponding to the third manufacturing step above, the double-sided adhesive tape 940 is bonded to the top window 10, and through the double-sided adhesive tape 940, the top window 10 is bonded to case 50 (along with the liquid crystal module 30).

Here, as shown in FIG. 4, because the conventional display device 900 is not provided with the positioning frame 20, the position of the liquid crystal module 30 may be largely moved, which possibly causes the liquid crystal module 30 including a glass substrate to make contact with the case 950. If the liquid crystal module 30 and the hard case 950, which is made of a magnesium alloy (having high shock resistance and low shock absorbency), make contact with each other, it is possible that external shock is directly transmitted to the liquid crystal module 30. In such a case, it is possible that the liquid crystal module 30 is damaged. For this reason, in order to prevent these components from making contact with each other even when the bonding position is moved, the margin 2Ltc needs to be set larger (at least larger than the margin 2Lt).

On the other hand, in the display device 100 of the present embodiment, the positioning frame 20 is made of a material that can absorb shock, and therefore, even if the liquid crystal module 30 makes contact with the positioning frame 20 (and even if the positioning frame 20 makes contact with the case 50), external shock is not directly transmitted to the liquid crystal module 30, which prevents damage in the liquid crystal module 30. Therefore, it is possible to set the margin 2Lt to a small value (at least smaller than the margin 2Ltc).

Specifically, if the conventional display device 900 is cut along the line A-A', and if a difference between the length (width) of the display device 900 along the line A-A' and the length (width) of the liquid crystal module 30 along the line A-A' is approximately 4 (mm), a difference between the length (width) of the display device 100 of the present embodiment along the line A-A' and the length (width) of the liquid crystal module 30 along the line A-A' is approximately 3.6 (mm). In this case, because 2Lt−2Ltc=4 (mm), it is possible to reduce a frame region and the size of the device by 4 (mm).

3. Effect

As described above, in the present embodiment, the liquid crystal module 30 is attached to the top window 10 by inserting the liquid crystal module 30 into the positioning frame 20 attached to the top window 10. This makes it possible to eliminate a need to take into account a margin for misalignment for this attachment process. As a result, a size reduction and a narrower frame in the display device can be achieved.

4. Modification Examples

4.1 Modification Example 1

Figure 5:
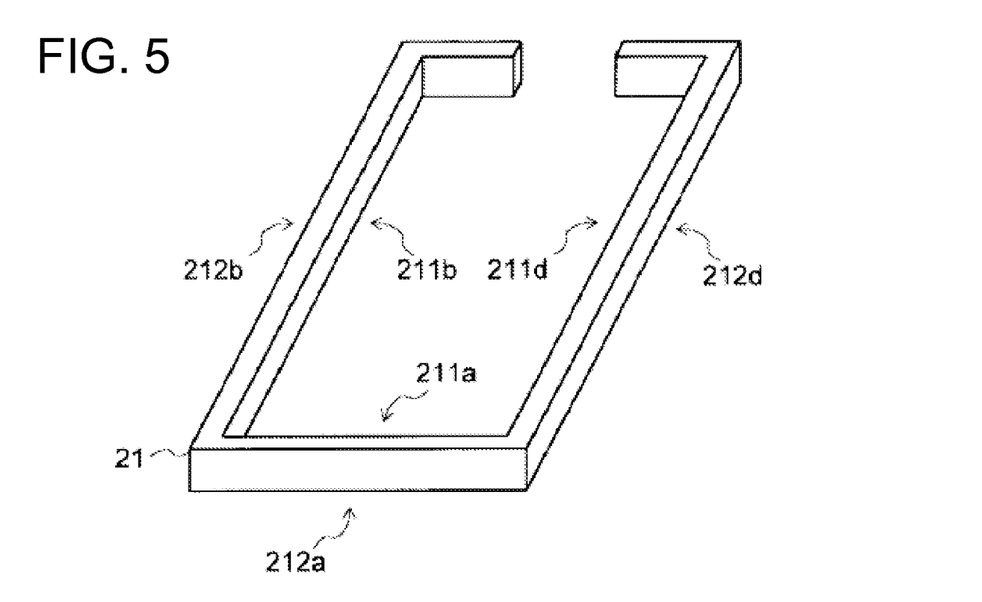
FIG. 5 is a schematic perspective view showing a structure of a modification example of a positioning frame in the embodiment.

FIG. 5 is a schematic perspective view showing a structure of a modification example of the positioning frame shown in FIG. 3. In a positioning frame 21 shown in FIG. 5, a part of the positioning frame 20 shown in FIG. 3 including portions of the inner side face 201*c* and the outer side face 202*c* is omitted.

Even when a portion of the frame member is omitted in this manner, by making the outer side face 212*a* shown in FIG. 5 and a corresponding outer side face of the top window 10 lie on the same plane, and by making the outer side face 202*b* or the outer side face 212*d* in the positioning frame 21 and a corresponding outer side face of the top window 10 lie on the same plane, the positioning frame 21 can be bonded to the top window 10 accurately with ease so as not to protrude to the outside.

By placing the liquid crystal module 30 inside of the positioning frame 21 (inside of the area enclosed by three inner side faces 211*a*, 211*b*, and 211*d*), the liquid crystal module 30 can be bonded to the top window 10 in a proper position with ease.

Figure 6:
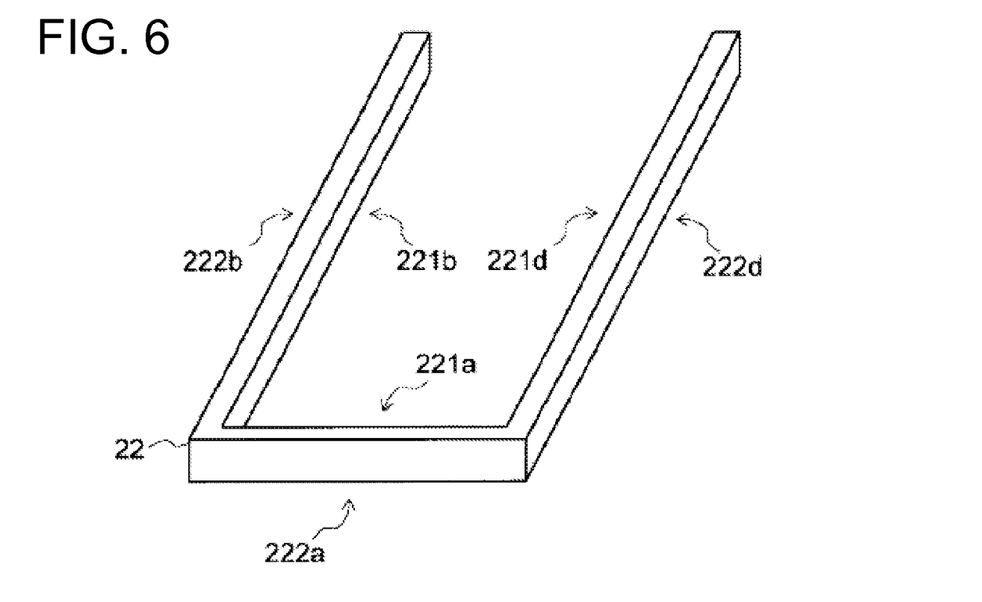
FIG. 6 is a schematic perspective view showing a structure of another modification example of the positioning frame in the embodiment.

As shown in FIG. 6, it is also possible to omit one side of the frame member entirely. FIG. 6 is a schematic perspective view showing a structure of another modification example of the positioning frame shown in FIG. 3. In a positioning frame 22 shown in FIG. 6, the inner side face 201*c* and the outer side face 202*c* in the positioning frame 20 shown in FIG. 3 is entirely omitted.

Even with the configuration of the positioning frame 22 shown in FIG. 6, in a manner similar to the positioning frame 21 in FIG. 5, it is possible to bond the positioning frame 22 to the top window 10 accurately with ease so as not to protrude to the outside, and also by inserting the liquid crystal module 30 into an inside area enclosed by the three inner side faces 221*a*, 221*b*, and 221*d*, the liquid crystal module 30 can be bonded to the top window 10 in a proper position with ease.

As described above, the positioning frame 21 shown in FIG. 5 and the positioning frame 22 shown in FIG. 6 can achieve accurate positioning in a manner similar to the positioning frame 20 shown in FIG. 3. However, because a portion of each frame member is omitted, these frame members are susceptible to deformation when receiving an external force. On the other hand, the positioning frame 20 shown in FIG. 3 having a frame shape is not susceptible to deformation, and because it is possible to achieve accurate positioning even when an external force is applied, the positioning frame 20 is more preferable.

In the positioning frame 21 shown in FIG. 5, any portion including other outer side faces and inner side faces may be omitted, or two or more portions separated from each other may be omitted. However, when two to four portions are omitted, the positioning frame 21 are separated into two to four parts, and the man-hour required for attaching the frame member to the top window 10 is increased. Also, depending on how the frame member is divided, there may be a part that cannot be bonded in a proper position. For this reason, the configuration of the positioning frame 20 shown in FIG. 3 is more preferable.

4.2 Modification Example 2

Figure 7:
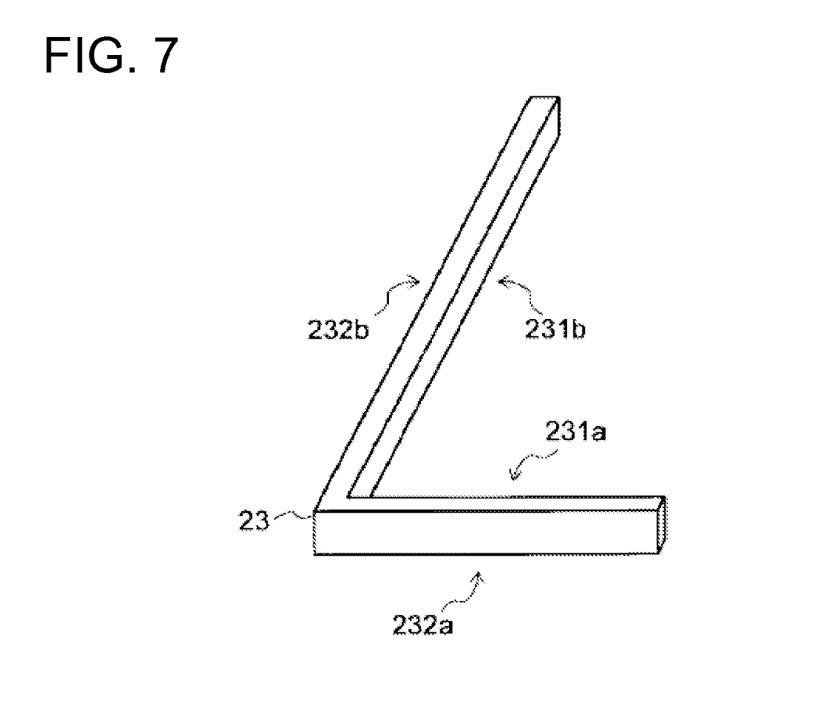
FIG. 7 is a schematic perspective view showing a structure of yet another modification example of the positioning frame in the embodiment.

FIG. 7 is a schematic perspective view showing a structure of yet another modification example of the positioning frame shown in FIG. 3. In the positioning frame 23 shown in FIG. 7, the inner side faces 201*c*, 201*d* and the outer side faces 202*c*, 202*d* in the positioning frame 20 shown in FIG. 3 are entirely omitted.

Even when a portion of the frame member is omitted in this manner, by making the outer side face 232*a* shown in FIG. 7 and a corresponding outer side face of the top window 10 lie on the same plane, and by making the outer side face 232*b* in the positioning frame 23 and a corresponding outer side face of the top window 10 lie on the same plane, the positioning frame 23 can be bonded to the top window 10 accurately with ease so as not to protrude to the outside.

Also, by positioning the liquid crystal module 30 so as to make contact with the inner sides of the positioning frame 23 (that is, the inner side faces 231*a* and 231*b*), the liquid crystal module 30 can be bonded to the top window 10 in a proper position with ease.

However, because the positioning frame 23 has only two inner side faces, it is not possible to determine the position of the liquid crystal module 30 by inserting the liquid crystal module 30 into the positioning frame 23. As a result, the self-alignment effect cannot be achieved. For this reason, the configuration of the positioning frame 20 shown in FIG. 3 is more preferable. Also, because the positioning frame 20 is not susceptible to deformation, and can achieve accurate positioning even when an external force is applied, the configuration thereof shown in FIG. 3 is more preferable.

In some cases, the positioning frame 23 shown in FIG. 7 is not securely bonded to the case 50 only with the double-sided adhesive tape 40. In this case, it may be necessary to take a countermeasure such as providing a fixing frame member near the position where a portion of the frame member is omitted, or forming the case 50 in a manner similar to that of the conventional display device 900 and bonding the case 50 to the top window 10. For this reason, the configurations of the positioning frames 20 to 22 are more preferable.

4.3 Modification Example 3

Figure 8:
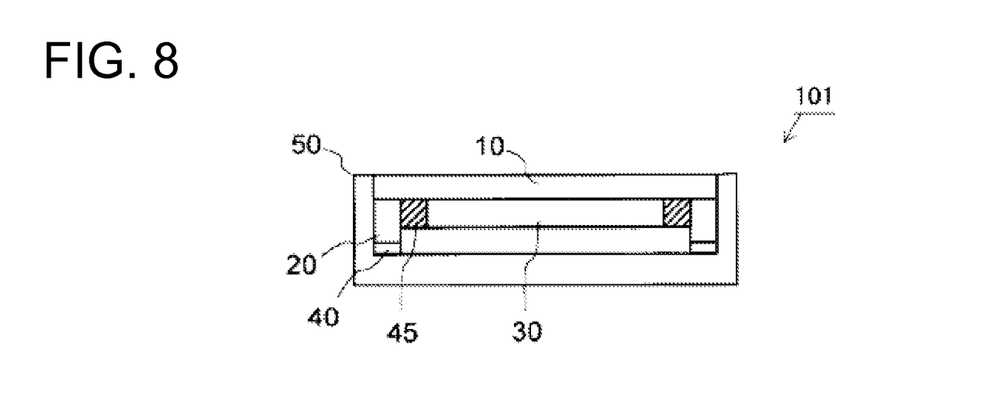
FIG. 8 is a simplified cross-sectional view showing a structure of the third modification example of the display device of the embodiment.

FIG. 8 is a simplified cross-sectional view showing a configuration of a display device of Modification Example 3. A display device 101 shown in FIG. 8 further includes an adhesive agent 45, in addition to the same constituting elements as those in the display device 100 shown in FIG. 2, which are provided with the same reference characters, and the manufacturing process thereof differs from that of the display device 100.

That is, in the second manufacturing step above, the liquid crystal module 30 is inserted in the positioning frame 20, and is bonded to the top window 10. However, in this example, before being bonded to the top window 10, the liquid crystal module 30 is inserted in the positioning frame 20 first, and the positioning frame 20 is bonded to the liquid crystal module 30 by the adhesive agent 45.

Next, in a manufacturing step corresponding to the first manufacturing step above, the positioning frame 20 is bonded to the top window 10 accurately so as not to protrude to the outside. In this step, by making the respective outer side faces lie on the same plane, these components can be accurately bonded to each other as described above.

Thereafter, in a manufacturing step same as the third manufacturing step, the double-sided adhesive tape 40 is bonded to a surface of the positioning frame 20 opposite to the surface thereof bonded to the top window 10, and through the double-sided adhesive tape 40, the positioning frame 20 is bonded to the case 50 (along with the top window 10 and the liquid crystal module 30).

By manufacturing (assembling) the display device 101 through the above-mentioned manufacturing process (assembly process), in a manner similar to the display device 100, it is possible to eliminate a need to take into account a margin for misalignment in attaching the liquid crystal module 30 to the top window 10.

4.4 Other Modification Examples

In the above embodiments and modification examples, components were bonded through a known adhesive material such as a double-sided adhesive tape or an adhesive agent, but this is only an example. Any configuration may be employed as long as the respective components are fixed to each other, and the respective components may be fixed to each other by using a known method such as using a bolt, a screw, or a pin. The configuration using an adhesive material is preferable since it is a simple and reliable method to fix respective surfaces to each other.

In the above embodiments and modification examples, the liquid crystal module 30 was configured to include a glass substrate, but the substrate may be made of other materials such as plastic that are undesirable to make direct contact with the case 50. Also, a known display module using an organic EL element or the like may be used instead of the liquid crystal module 30 using a liquid crystal element.

The liquid crystal module 30 was configured to include a touch panel, but as long as the surface protector is attached to the upper surface thereof, any configuration may be employed. For example, in cases such as when the glass thickness of a liquid crystal panel is small, a surface protector is attached regardless of the presence of a touch panel. Therefore, the liquid crystal module 30 does not necessarily have to have a touch panel. It is also possible to employ a configuration in which a touch panel is attached to a surface protector.

INDUSTRIAL APPLICABILITY

The present invention is used for a display device such as a liquid crystal display device, for example, and is suitable for a display device that has a surface protector attached to a display surface thereof.

DESCRIPTION OF REFERENCE CHARACTERS

10 top window
20 to 23 positioning frame
30 liquid crystal module
40 double-sided adhesive tape
45 adhesive agent
50 case
100, 101 display device

The invention claimed is:

1. A display device, comprising:
a display module having a rectangular display surface;
a case in which the display module is stored;
a surface protector in a flat plate shape attached to the display surface of the display module so as to protect the display surface entirely, the surface protector having a flat surface that faces the display surface and that is larger than the display surface, the surface protector also having outer side faces perpendicular to said flat surface; and
a positioning member attached to said flat surface of the surface protector for defining a position of the display module with respect to the surface protector, the positioning member having first and second inner side faces adjacent to each other, the first and second inner side faces being perpendicular to a surface of the positioning member facing said flat surface, the first and second inner side faces facing or making contact with corresponding side faces of the display module,
wherein the positioning member has first and second outer side faces that are adjacent to each other and that are respectively parallel to the first and second inner side faces, and the positioning member is attached to the surface protector such that the first and second outer side faces lie on substantially same planes as corresponding adjacent two side faces, respectively, among the outer side faces of the surface protector, and
wherein the positioning member has a third inner side face that is parallel to one of the first and second inner side faces and that is in contact with another of the first and second inner side faces, and a third outer side face that is parallel to one of the first and second outer side faces and that is in contact with another of the first and second outer side faces,
wherein the third inner side face faces or makes contact with one of side faces of the display module, and
wherein the third outer face and one of the outer side faces of the surface protector lie on a substantially same plane.

2. The display device according to claim 1, wherein the positioning member is formed in a frame shape that has four inner side faces including the first to third inner side faces, and four outer side faces including the first to third outer side faces.

3. The display device according to claim 1, wherein the display module includes a touch panel.

4. The display device according to claim 1, wherein the display module includes a glass substrate.

5. A display device, comprising:
a display module having a rectangular display surface;
a case in which the display module is stored;
a surface protector in a flat plate shape attached to the display surface of the display module so as to protect the display surface entirely, the surface protector having a flat surface that faces the display surface and that is larger than the display surface, the surface protector also having outer side faces perpendicular to said flat surface; and
a positioning member attached to said flat surface of the surface protector for defining a position of the display module with respect to the surface protector, the positioning member having first and second inner side faces adjacent to each other, the first and second inner side faces being perpendicular to a surface of the positioning member facing said flat surface, the first and second inner side faces facing or making contact with corresponding side faces of the display module,
wherein the positioning member has first and second outer side faces that are adjacent to each other and that are respectively parallel to the first and second inner side faces, and the positioning member is attached to the surface protector such that the first and second outer side faces lie on substantially same planes as corresponding adjacent two side faces, respectively, among the outer side faces of the surface protector, and wherein the positioning member is bonded to the case through an adhesive agent, the adhesive agent being provided to the positioning member on a flat surface that is opposite to the surface facing the surface protector.

6. The display device according to claim 5, wherein the display module includes a touch panel.

7. The display device according to claim 5, wherein the display module includes a glass substrate.

8. A display device, comprising:

a display module having a rectangular display surface;

a case in which the display module is stored;

a surface protector in a flat plate shape attached to the display surface of the display module so as to protect the display surface entirely, the surface protector having a flat surface that faces the display surface and that is larger than the display surface, the surface protector also having outer side faces perpendicular to said flat surface; and a positioning member attached to said flat surface of the surface protector for defining a position of the display module with respect to the surface protector, the positioning member having first and second inner side faces adjacent to each other, the first and second inner side faces being perpendicular to a surface of the positioning member facing said flat surface, the first and second inner side faces facing or making contact with corresponding side faces of the display module, wherein the positioning member has first and second outer side faces that are adjacent to each other and that are respectively parallel to the first and second inner side faces, and the positioning member is attached to the surface protector such that the first and second outer side faces lie on substantially same planes as corresponding adjacent two side faces, respectively, among the outer side faces of the surface protector, and wherein the surface protector is bonded to both of the positioning member and the display module through an adhesive agent, respectively.

9. The display device according to claim 8, wherein the display module includes a touch panel.

10. The display device according to claim 8, wherein the display module includes a glass substrate.

11. A display device, comprising:

a display module having a rectangular display surface;

a case in which the display module is stored;

a surface protector in a flat plate shape attached to the display surface of the display module so as to protect the display surface entirely, the surface protector having a flat surface that faces the display surface and that is larger than the display surface, the surface protector also having outer side faces perpendicular to said flat surface; and a positioning member attached to said flat surface of the surface protector for defining a position of the display module with respect to the surface protector, the positioning member having first and second inner side faces adjacent to each other, the first and second inner side faces being perpendicular to a surface of the positioning member facing said flat surface, the first and second inner side faces facing or making contact with corresponding side faces of the display module, wherein the positioning member has first and second outer side faces that are adjacent to each other and that are respectively parallel to the first and second inner side faces, and the positioning member is attached to the surface protector such that the first and second outer side faces lie on substantially same planes as corresponding adjacent two side faces, respectively, among the outer side faces of the surface protector, wherein the positioning member is bonded to the surface protector through an adhesive agent, and wherein the display module is attached to the surface protector by being bonded to the positioning member through an adhesive agent.

12. The display device according to claim 11, wherein the display module includes a touch panel.

13. The display device according to claim 11, wherein the display module includes a glass substrate.

* * * * *